Oct. 25, 1960                P. M. WOODWORTH                2,957,278
                         MASONRY CONSTRUCTION SYSTEMS
Filed July 5, 1956                                    8 Sheets-Sheet 2
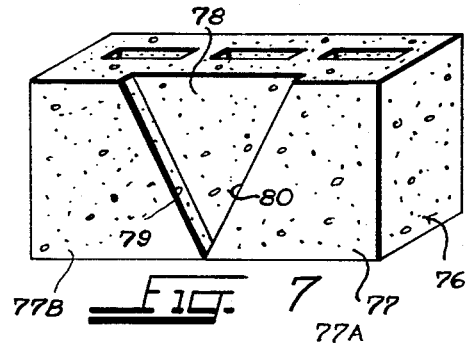
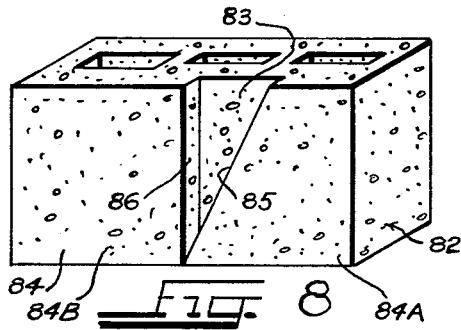
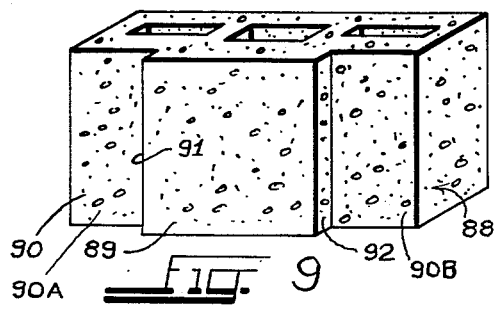
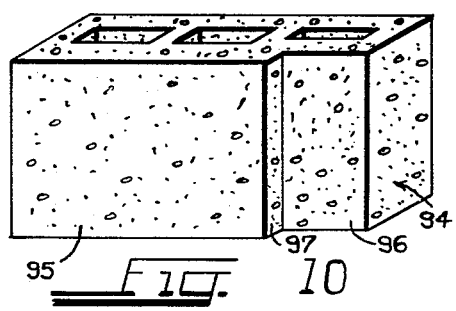
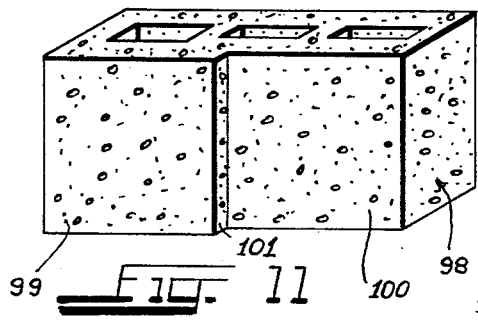
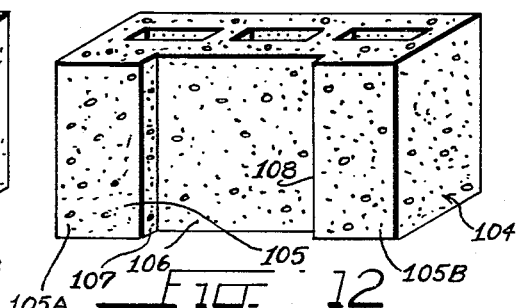
INVENTOR.
PAUL M. WOODWORTH
BY
Wallace and Cannon
Atty's.

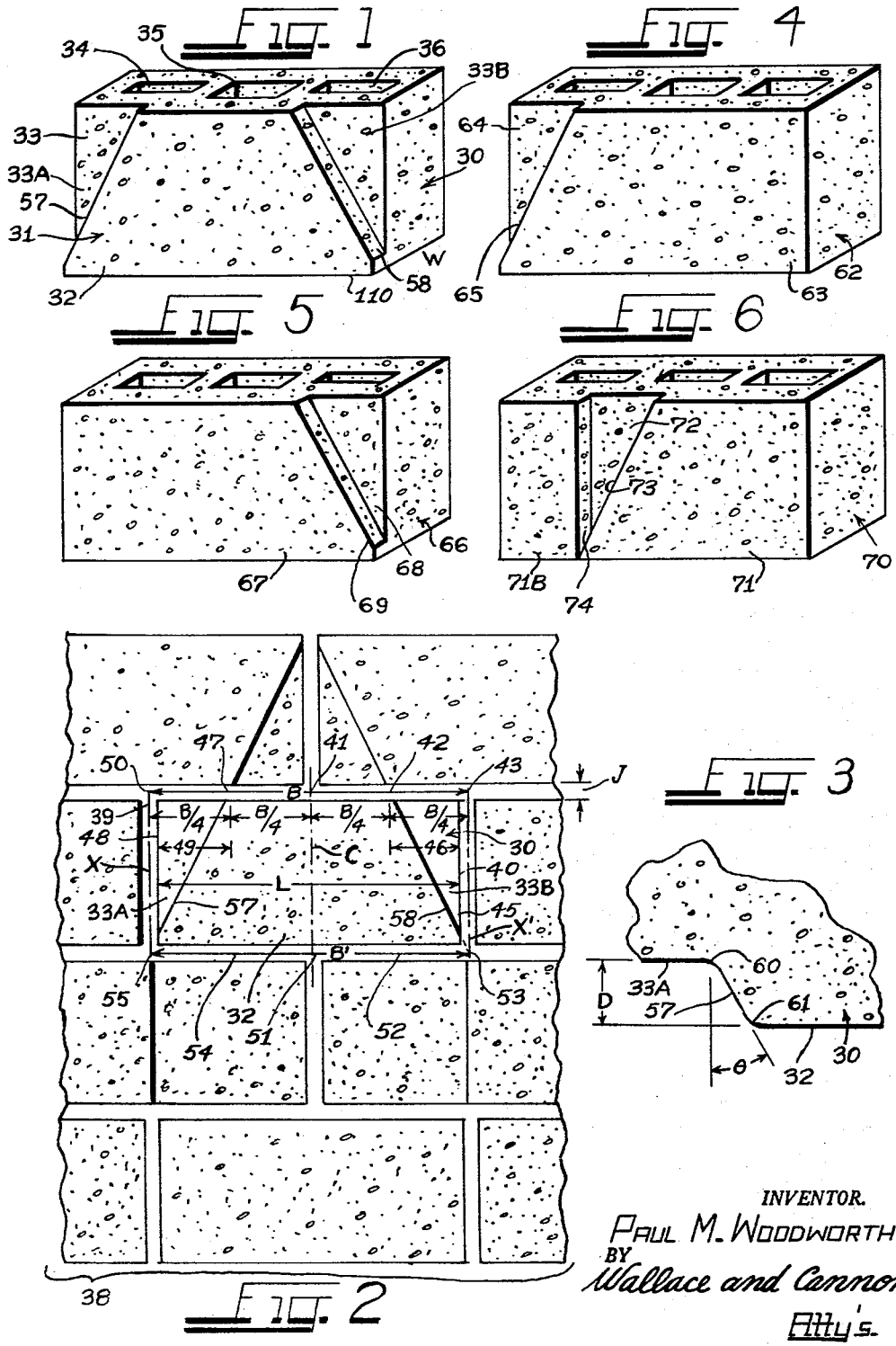

INVENTOR.
PAUL M. WOODWORTH
BY
Wallace and Cannon
Atty's.

INVENTOR.
PAUL M. WOODWORTH
BY
Wallace and Cannon
Atty's.

Oct. 25, 1960    P. M. WOODWORTH    2,957,278
MASONRY CONSTRUCTION SYSTEMS
Filed July 5, 1956    8 Sheets-Sheet 5
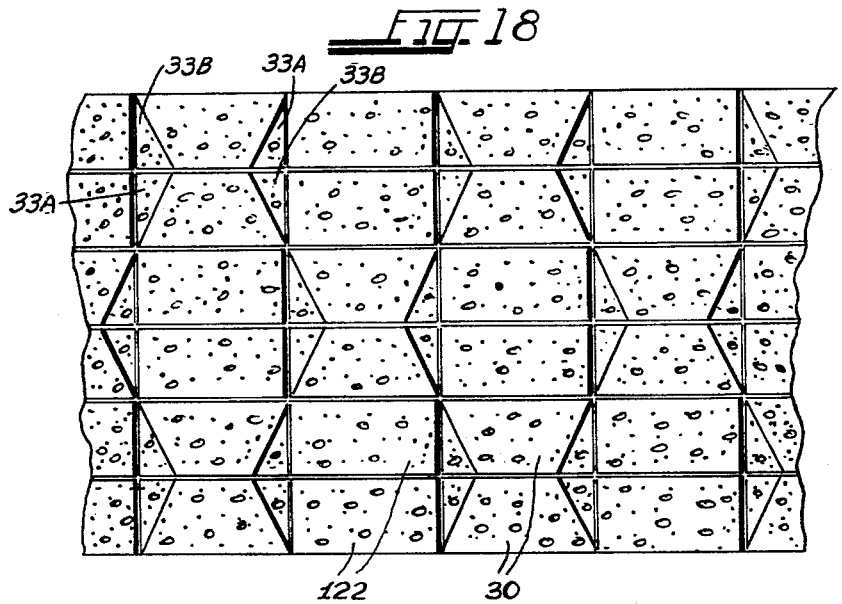
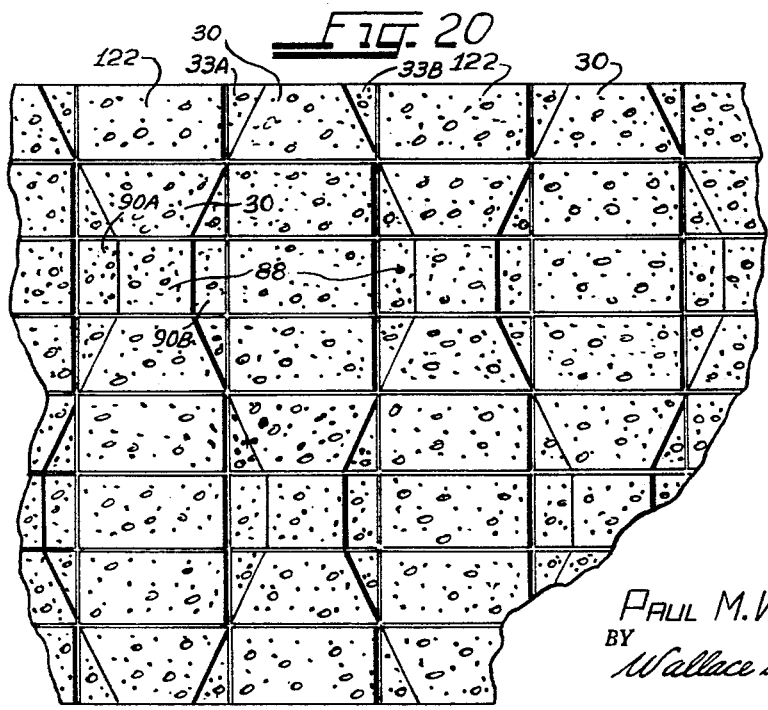
INVENTOR.
PAUL M. WOODWORTH
BY
Wallace and Cannon
Atty's.

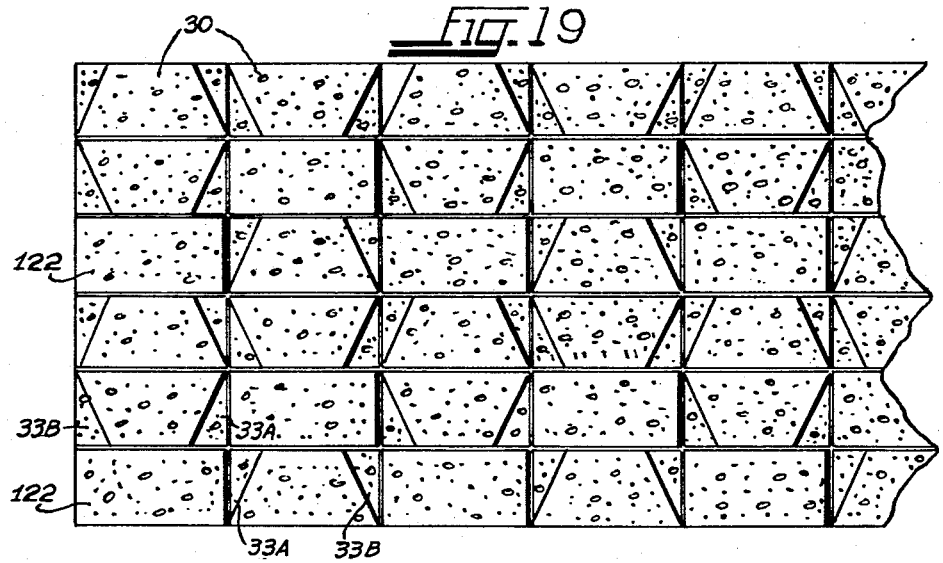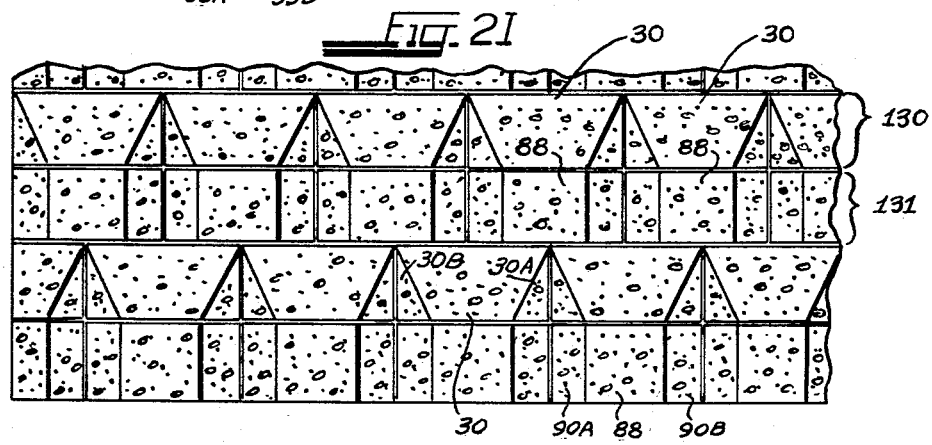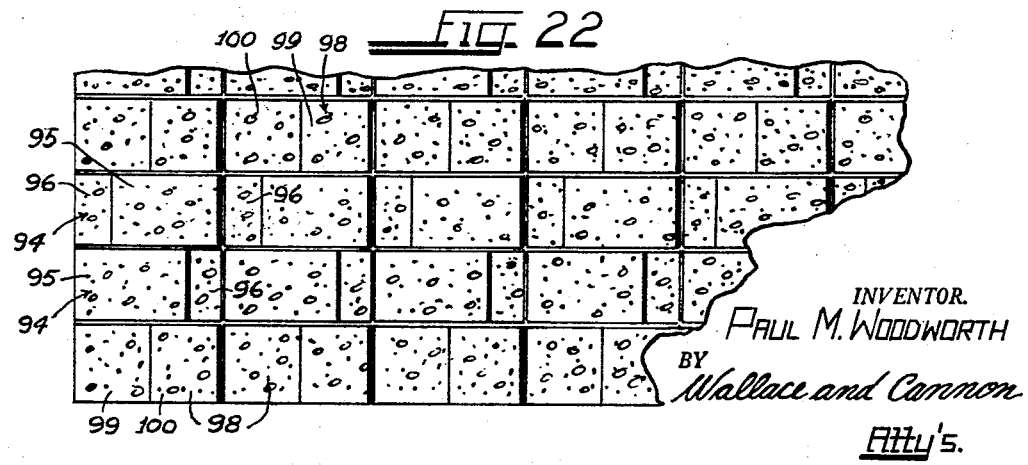

Oct. 25, 1960

P. M. WOODWORTH 2,957,278

MASONRY CONSTRUCTION SYSTEMS

Filed July 5, 1956

INVENTOR.
PAUL M. WOODWORTH
BY
Wallace and Cannon
Atty's.

United States Patent Office 2,957,278
Patented Oct. 25, 1960

2,957,278

MASONRY CONSTRUCTION SYSTEMS

Paul M. Woodworth, Glen Ellyn, Ill., assignor to National Concrete Masonry Association, Chicago, Ill., a corporation of Illinois Filed July 5, 1956, Ser. No. 595,984

10 Claims. (Cl. 50—273)

This invention relates to a modular construction system for masonry walls and to masonry walls constructed with masonry units fabricated in accordance with that system.

In the past, a number of different proposals have been advanced for fabricating concrete blocks, brick, and other masonry units to provide decorative effects in the finished wall. Most of these systems or types of masonry units have been characterized by extreme limitations in the number of different combinations or decorative effects which can be achieved through their use. Consequently, and in view of the fact that no one wall design or even a limited number of wall designs is satisfactory to more than a few users, these proposed systems and wall structures have not found widespread acceptance. The prior art proposals have been characterized by almost prohibitive cost, since they have in virtually all instances been limited to the relatively small production runs needed for individual jobs.

Other antecedent proposals in this field have provided for a substantial degree of flexibility in the number of different designs or decorative combinations which could be achieved; these systems, however, have required a relatively large number of different units to obtain the multiplicity of potential designs necessary to meet the requirements of prospective purchasers. Consequently, these multi-unit systems have faced the same economic disadvantages as those incorporating only a few different units.

It is an object of the invention, therefore, to afford a system for masonry wall construction in which a relatively large number of different decorative patterns or combinations may be achieved with a relatively small number of different unit structures.

Another object of the invention is to achieve, in a masonry wall, a variety of different geometric or design effects which are continuous between adjacent masonry units and which may be constructed with a relatively small number of different unit structures.

An additional object of the invention is the construction of a masonry wall which exhibits a continuous-line-and-area geometric pattern independent of the mortar or joint lines of the wall.

It is a corollary object of the invention to provide a new and improved decorative masonry wall and masonry construction system which is inherently economical as compared with known systems.

Accordingly, the invention relates to a modular construction system for masonry walls and to masonry walls constructed with modular units fabricated in accordance with the inventive system. The invention contemplates a series of different masonry units each having first and second parallel face surfaces which are spaced from each other by a predetermined distance which is small in relation to the thickness of the units. In each instance, these face surfaces terminate at points corresponding to complementary quarter-modular points along the longitudinal base lines of the decorative units and are linked by a boundary surface of regular geometric configuration interconnecting the longitudinal base lines to afford a multiplicity of different combinations of similar units. In each of these combinations, corresponding surfaces may be matched to each other. The units further afford an additional multiplicity of different combinations including mixtures of different units having corresponding surfaces matched to each other. In any of these combinations, the masonry units may be aligned with respect to each other so that the boundary surfaces of adjacent units design a continuous geometric pattern on the wall face. The masonry unit series includes at least one unit in which the boundary surface is normal to the longitudinal base lines of the units and effectively interconnects corresponding quarter-points on the longitudinal base lines of the unit. The series further includes at least one unit in which the boundary surface effectively interconnects quarter points on the longitudinal base lines which are displaced by one quarter-modular distance with respect to each other.

Throughout this specification and in the claims appended hereto, the term "quarter-modular distance" is expressly defined as constituting one-fourth of a total distance equal to the sum of the overall length of a masonry unit plus the thickness of the usual mortar joint separating that unit from the next adjacent unit. Thus, for each masonry unit, there are a total of five quarter-modular points on each longitudinal base line of the unit; these points constitute the longitudinal center of the masonry unit and two additional points on each side of that center point, each point being separated from the next adjacent point by a quarter-modular distance.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is an isometric view of a masonry unit, sometimes referred to hereinafter as a brick or block, which forms a part of the inventive construction system;

Fig. 2 is an elevation view of a masonry wall constructed in accordance with one embodiment of the invention;

Fig. 3 is a sectional view, partly cut away, of a relatively small portion of the masonry block of Fig. 1;

Figs. 4 through 12 are isometric views showing additional masonry units which may be incorporated in the inventive modular construction system and in walls fabricated in accordance with the invention; and Figs. 13 through 26 are elevation views, on a reduced scale, showing examples of different wall structures fabricated in accordance with the invention.

Figure 13:
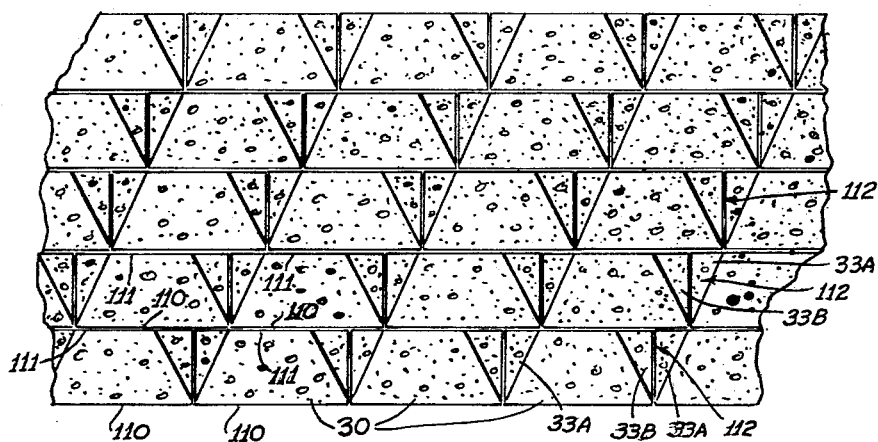

The masonry unit 30 shown in Fig. 1 is in many respects essentially similar in construction to a standard concrete block and may constitute either a partition-type unit or a load-bearing unit. The face 31 of block 30 has two parallel face surfaces 32 and 33, surface 33 comprising two segments 33A and 33B. Face surfaces 32 and 33 of the block are spaced from each other by a predetermined distance which is relatively small in relation to the width or thickness W of the block. The block may be provided with cores or vertical internal openings 34, 35, and 36 which are in most respects essentially similar to the cores of conventional concrete blocks.

The modular nature of the face surfaces 32 and 33 of block 30 is best illustrated in the enlarged view of Fig. 2, in which block 30 is shown as an integral part of a wall section 38 constructed in accordance with the invention. In Fig. 2, the overall length of block 30 is indicated by distance L and the longitudinal center of the block is indicated by dash line C. In a conventional block having a nominal face size of 16 inches by 8 inches, the actual length L of the block is made to be 15 and 5/8 inches, allowing 3/8 inch for the thickness T of the mortar joints between adjacent blocks. Accordingly, if it is assumed that block 30 is an 8" x 16" block, the overall length of the two longitudinal mortar centerlines or base lines B and B' of the block are each approximately 16 inches, the base lines being taken parallel to the upper and lower edges of the block and extending beyond the block to the centerlines X and X' of the two side or transverse mortar joints 39 and 40. The intersection of center line C with base line B provides a first quarter-modular point 41 on the base line. A second quarter-modular point 42 is spaced one-fourth of the length of base line B from point 41 along the base line; in the case of a 16 inch block, points 41 and 42 would be separated by 4 inches. A third quarter-modular point 43, which coincides with the center of mortar joint 40, is also located on base line B and is separated from point 42 by one-fourth the length of base line B. It should be noted, however, that point 43 does not coincide precisely with the corner of block 30, since allowance must be made for the thickness of the mortar joint. Accordingly, the distance from quarter-modular point 42 to the edge 45 of block 30 is taken as one-fourth the base line length less one-half the thickness of the mortar joint. In the typical case of a 16 inch conventional size block, allowing 3/8 inch for the mortar joint, the distance 46 separating quarter-modular point 42 from edge 45 of the block is 3 and 13/16 inches.

Two additional quarter-modular points can be located on longitudinal base line B at the side of point 41 opposite points 42 and 43. One of these is point 47, which is spaced from point 41 by a distance of 4 inches and from the edge point 48 of block 30 by a distance 49 which, in a conventional 16 inch block, would be 3 and 13/16 inches. The other point 50 coincides with the center line of mortar joint 39. Five similar quarter-modular points 51, 52, 53, 54, and 55 may be similarly identified on the lower or second base line B' relating to block 30.

As shown in Figs. 1 and 2, face surfaces 32 and 33A of block 30 are interconnected by a boundary surface 57, which effectively terminates at quarter-modular points 47 and 55. Actually, boundary surface 57 is located on the block face in such a position that, if extended, it would reach these two quarter-modular terminal points, although it is extended physically beyond the edges of the block. A second similar boundary surface 58 interconnects face surfaces 32 and 33B and is aligned to effectively terminate at quarter-modular points 42 and 53. The boundary surfaces do not necessarily extend perpendicularly with respect to face surfaces 32 and 33; the preferred relationship is illustrated in the greatly enlarged view of Fig. 3, which shows a relatively small portion of block 30 in cross section at the region of intersection of surfaces 32, 33A, and 57. As indicated in that figure, boundary surface 57 preferably extends at an angle θ of approximately thirty degrees with respect to the normal to the block face surfaces. Moreover, it is desirable to avoid sharp corners in the block face construction; both of the intersections 60 and 61 are rounded in constructing the block in order to facilitate manufacturing. The spacing D between face surfaces 32 and 33A is usually relatively small; in the usual concrete block structure, it may be of the order of 1/2 inch, but is not critical.

The block 30 of Fig. 1 constitutes one of several different masonry units each of which may be utilized in modular wall structures fabricated in accordance with the invention. Each of Figs. 4 through 12 illustrates an additional masonry unit also constructed in accordance with the inventive concept. Thus, Fig. 4 shows a block 62 having a first face surface 63 which is parallel to and spaced by a relatively short distance from a second face surface 64. Surfaces 63 and 64 of block 62 are interconnected by a boundary surface 65, which extends between the two longitudinal base lines of the unit, when set into a wall. By reference to Fig. 2, it will be seen that boundary surface 65 extends between quarter-modular points corresponding to points 47 and 55 as designated in the latter figure. The masonry unit 66 illustrated in Fig. 5 is essentially the reverse or obverse of block 62 of Fig. 4. The two face surfaces 67 and 68 of block 66 are joined by a boundary surface 69 which effectively extends between the two base line quarter-modular points designated in Fig. 2 as points 42 and 53.

Fig. 6 is in many respects quite similar to Figs. 4 and 5 and illustrates a concrete block 70 having a first face surface 71 which includes two sections 71A and 71B which are separated from each other by a second face surface 72. Surface 72 is linked to surfaces 71A and 71B by two boundary surfaces 73 and 74 respectively. Boundary surface 73 extends between quarter points on the longitudinal base lines of block 70, when mounted in a wall, corresponding to points 41 and 54 as designated in Fig. 2. Boundary surface 74, on the other hand, is normal to the longitudinal base lines of block 70 and interconnects the two directly opposed or corresponding quarter-modular points 47 and 54 on the base lines of the unit.

The masonry unit 76 shown in Fig. 7 also includes two different face surfaces 77 and 78, surface 77 being divided into two sections 77A and 77B which are separated from each other by face surface 78. The two face surfaces are interconnected by a pair of boundary surfaces 79 and 80. By referring to Fig. 2, it will be seen that the quarter-modular points interconnected by boundary surface 80 are points 42 and 51, whereas boundary surface 79 interconnects quarter-modular points 47 and 51. Thus, when mounted in a wall, both of the boundary surfaces effectively interconnect quarter-modular points on the longitudinal base lines of the unit which are displaced by one quarter-modular distance B/4 (Fig. 2) with respect to each other.

The concrete block 82 shown in Fig. 8 is quite similar to block 70 of Fig. 6 and comprises a first face surface 83 which separates the two sections 84A and 84B of the second face surface 84 of the block. A first boundary surface 85 interconnects surface 83 with surface 84A, whereas a second boundary surface 86 interconnects surfaces 83 and 84B. Again referring to Fig. 2, it will be seen that boundary surface 85 effectively extends between quarter-modular points 42 and 51, whereas the boundary surface 86 links quarter-modular points 41 and 51 when the block 82 is installed in a wall.

Fig. 9 shows a further embodiment of a masonry unit constructed in accordance with the inventive concept; the block 88 shown in this figure has a first face surface 89 situated between the two sections 90A and 90B of a second face surface 90 which is parallel to but spaced from face surface 89. Face surface 89 is joined to surface 90A by a boundary surface 91 and is linked to surface 90B by a second boundary surface 92. By reference to Fig. 2, it will be seen that the two boundary surfaces in the particular masonry unit are both normal to the longitudinal base lines B and B' and that both boundary surfaces effectively interconnect corresponding quarter-points on the two longitudinal base lines. Thus, boundary surface 91 effectively interconnects quarter-modular points 47 and 54, whereas boundary surface 92 effectively terminates at quarter-modular points 42 and 52.

In another masonry unit 94, shown in Fig. 10, the two face surfaces 95 and 96 are interconnected by a vertical boundary surface 97. Boundary surface 97 effectively extends between points 42 and 52 on the longitudinal base lines B and B' when block 94 is set into a wall, as may be seen by reference to Fig. 2. The block 98 shown in Fig. 11 is quite similar to block 94 of Fig. 10 except that in this instance the two face surfaces 99 and 100 are linked by a boundary surface 101 which interconnects the two central quarter-modular points 41 and 51 (Fig. 2).

The concrete block 104 shown in Fig. 12 is the reverse of unit 88 of Fig. 9 and includes a first face surface 105 which is separated into two segments 105A and 105B by a second parallel face surface 106. The face surfaces in this masonry unit are interconnected by a pair of boundary surfaces 107 and 108 which correspond to boundary surfaces 91 and 92 respectively of the previously-described block 88.

Masonry units constructed in accordance with the invention may be fabricated by increasing the thickness of the block or brick in restricted areas to form the front or outermost face surface. When this is done, in concrete block construction, the cores or openings 34—36 (Fig. 1) may be of standard dimensions. On the other hand, since this technique would require enlarging the molds in the block-manufacturing machinery, it is usually desirable to form the second surface required by the invention by placing an insert in the mold to define the second or recessed face surface of the block. Using this technique, the overall thickness W of the block (Fig. 1) is reduced somewhat. Consequently, in order to avoid weakening the block and to preserve its load-bearing characteristics, it is desirable to effect a corresponding reduction in the width of the cores or openings immediately behind the recessed surface. Thus, in block 30 of Fig. 1, cores 34 and 36 are reduced in depth by a distance approximately corresponding to the space D (Fig. 3) separating the two face surfaces 32 and 33 of the block. Similar reductions in depth of one or more of the cores would be required in load-bearing units constructed in accordance with the other illustrated embodiments of the invention, depending upon the location of the recessed face surfaces of the blocks. No change in core dimensions is required in non-load-bearing units.

Fig. 13 is an elevation view of a wall surface constructed in accordance with the invention and embodying a plurality of blocks 30 of the type illustrated in Fig. 1. In this particular wall construction, all of blocks 30 are aligned with their corresponding lower and upper surfaces 110 and 111 facing in the same direction; it will be understood that the terms "upper" and "lower" in this context are purely arbitrary. To form the illustrated pattern, the individual units are aligned with respect to each other so that corresponding surfaces 33A and 33B of adjacent blocks form a triangular recess 112 in the wall in each instance.

Figure 14:
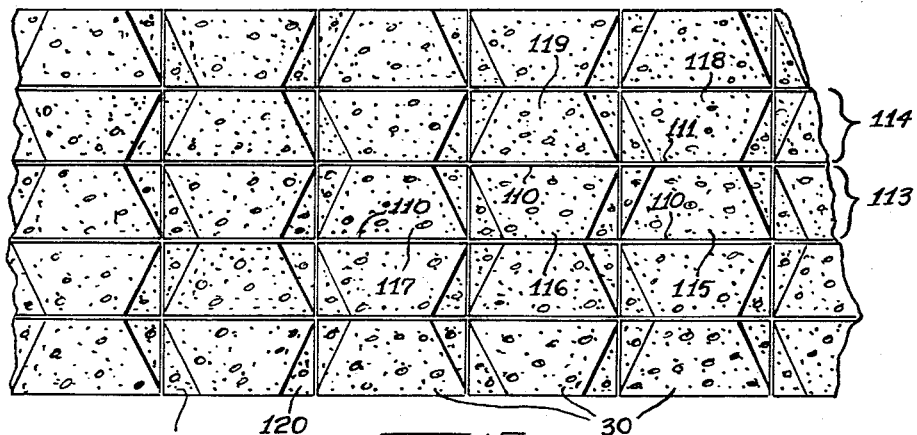

A second and completely different wall structure, which also uses only the blocks 30 constructed in accordance with the embodiment of Fig. 1, is shown in Fig. 14. In this embodiment, alternate courses 113 and 114 are reversed with respect to each other and are set with alternate blocks in each course similarly reversed with respect to each other. Thus, in course 113, the first block 115 is set with its lower surface 110 down, in the same position as illustrated for block 30 in Fig. 1. The next block 116 in course 113 is disposed with surface 110 facing upwardly, the third block 117 having the base 110 facing downwardly, and so on. In course 114, the first block 118 is disposed directly over block 115 of cores 113 with its "upper" surface 111 matched to the corresponding surface of block 115. Similarly, the second block 119 of course 114 is mounted directly over block 116 and is reversed with respect to both of blocks 116 and 118. The repetitive pattern thus formed comprises a series of undulating recesses 120 which traverse the entire wall surface in a vertical direction.

Figure 15:
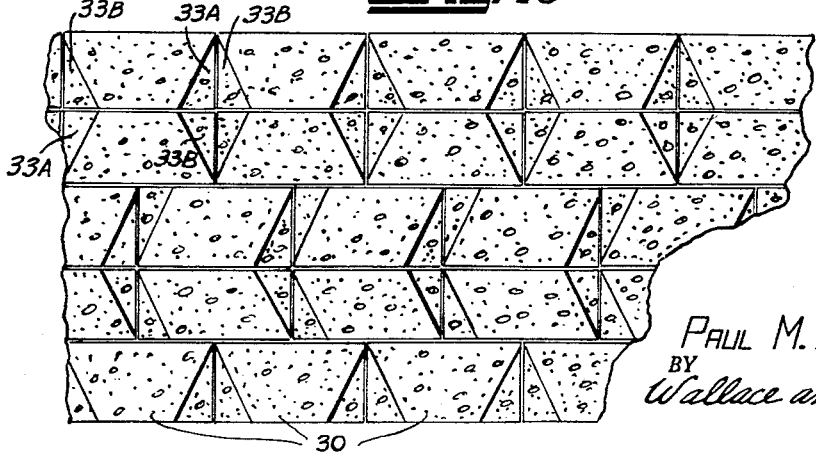
Figure 16:
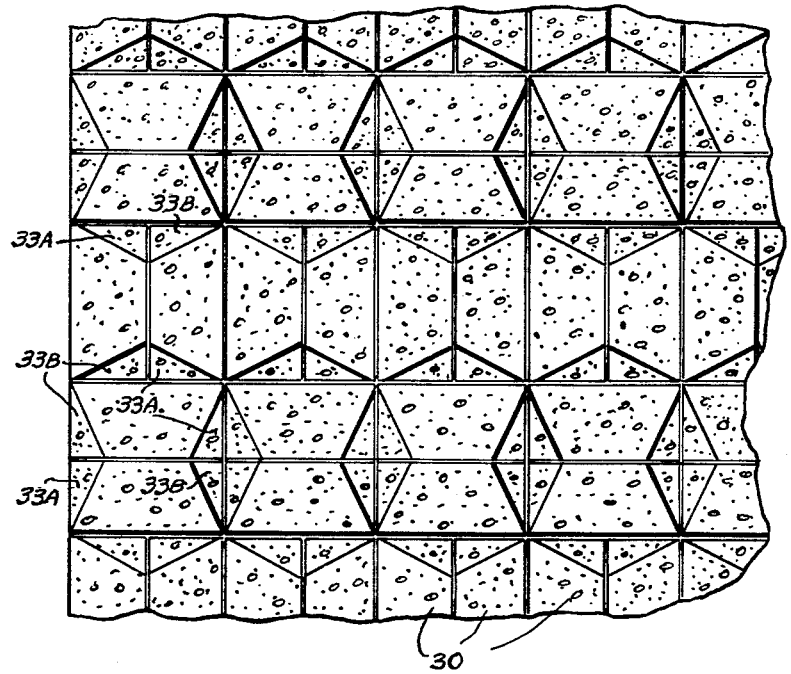

Figs. 15 and 16 illustrate additional embodiments of wall structures fabricated in accordance with the invention which utilize only the first-described embodiment, block 30, of the invention. As will be apparent by inspection, both of these wall surfaces are completely different from Figs. 13 and 14 and from each other, yet each forms a continuous geometric pattern of recessed wall areas which extend between adjacent blocks on the wall.

Figure 17:
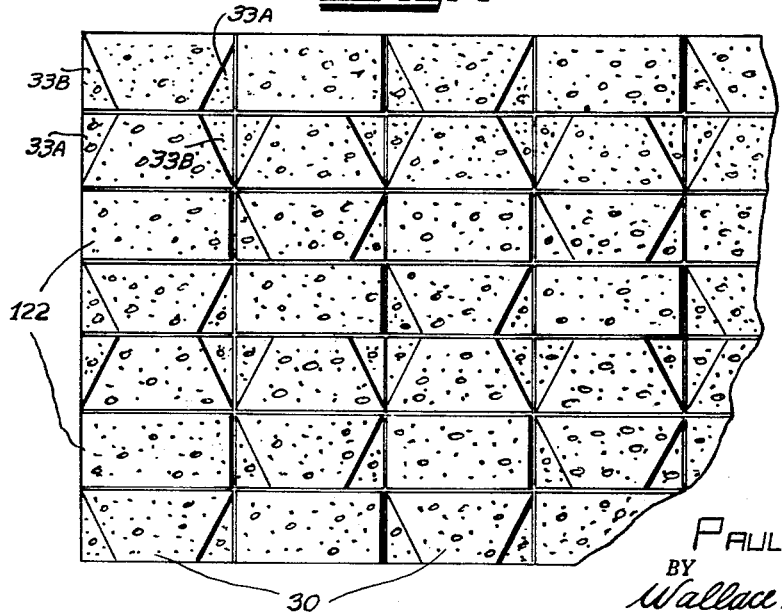

Figs. 13–16 represent only a relatively small sampling of the many different wall construction patterns which may be realized using only blocks of the type illustrated and described in connection with Fig. 1. An even greater multiplicity of pleasing and decorative wall patterns may be achieved through the use of this particular masonry unit structure in conjunction with other masonry units. A typical example of the latter type of pattern is shown in Fig. 17, in which the modular decorative masonry units 30 are combined with a plurality of plane-surfaced concrete blocks 122 of conventional construction. A similar combination of structural units is illustrated in Fig. 18, which affords an entirely different geometric pattern and consequently provides a completely different decorative effect. Fig. 19 illustrates yet another of the wide variety of different geometric patterns which may be achieved by use of conventional blocks 122 in conjunction with blocks 30.

Figure 23:
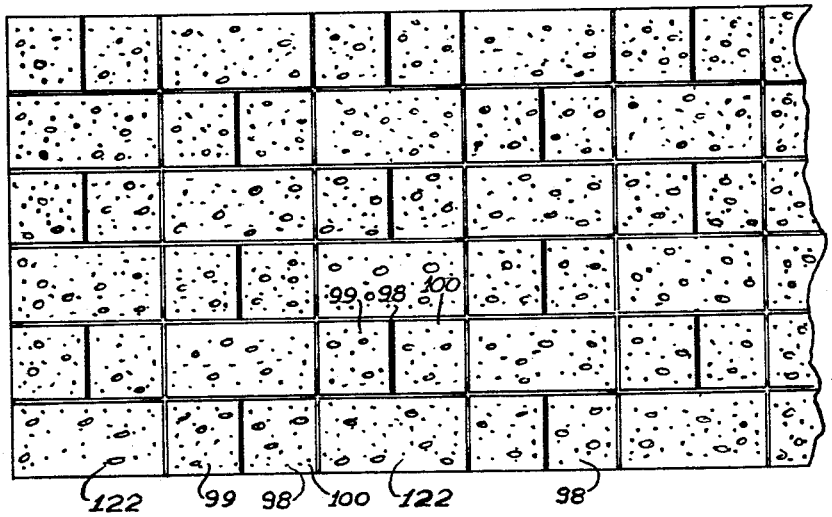
Figure 24:
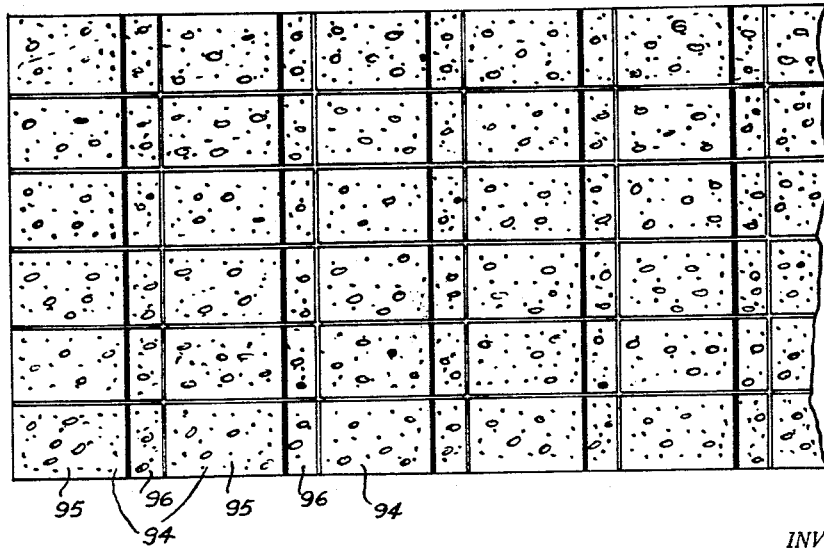

Some of the more pleasing of geometric patterns may be achieved by combining different units of the inventive modular series, either alone or in conjunction with standard single-surface units. Fig. 20 provides a typical example of this type of wall structure and combines a series of blocks 30 formed in accordance with the embodiment of Fig. 1, a plurality of different modular units 88 constructed in accordance with the embodiment of Fig. 9, and a plurality of conventional single-surface blocks 122. As will be immediately appreciated by a visual comparison of the figures, this pattern is completely different from any others described hereinbefore in connection with Figs. 13–19. Fig. 21, on the other hand, shows yet another distinctive wall structure; in this instance, the wall is constructed using only blocks 30 and blocks 88. In yet another embodiment of the invention, Fig. 22, blocks 94 and 98, constructed in accordance with Figs. 10 and 11, are combined to afford a distinctive effect; in Fig. 23, masonry units 98 are combined with conventional plane-surface units 122 to afford yet another different and decorative geometric pattern. The final wall structure, Fig. 24, is constructed with masonry units 94, which in this instance are not combined with any of the other units.

Figure 25:
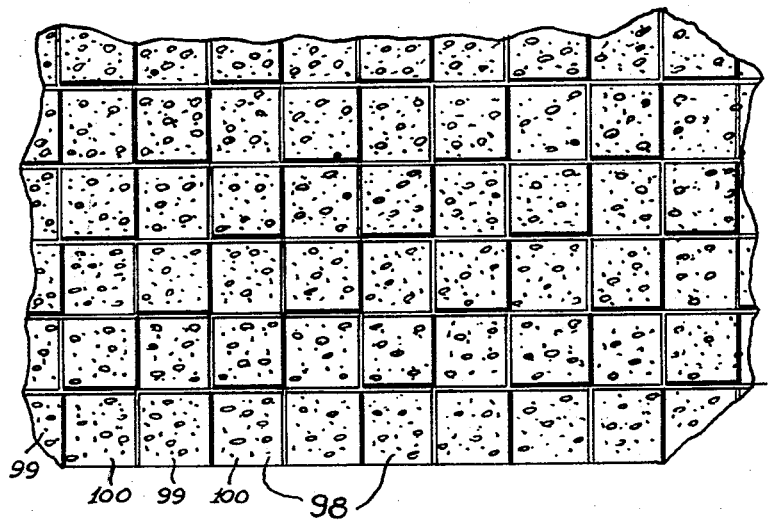
Figure 26:
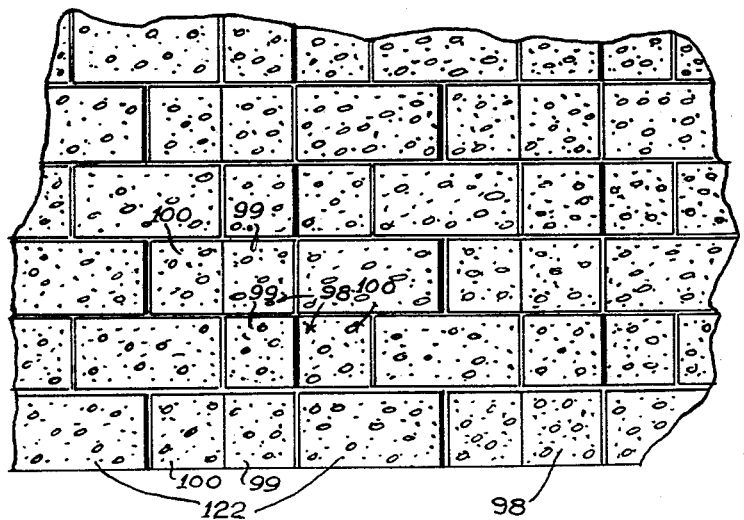

The wall structures described in connectio with Figs. 13–24 are constructed with several different types of bond; that is, the alignment of the masonry units in individual courses varies considerably in the several illustrated wall structures. Thus, Fig. 13 constitutes a typical example of a wall construction conventionally known in the art as a quarter-bond structure, the individual masonry units of adjacent courses overlapping each other for approximately one fourth the length of an individual unit. The wall construction shown in Fig. 14, on the other hand, is typical of what is generally known as a stacked bond, whereas the construction of Fig. 15 is a combination of a stacked bond and a conventional running bond. Pleasing decorative effects can also be achieved in a wall construction based upon the use of the running bond throughout the wall. Typical examples of running-bond wall structures fabricated in accordance with the inventive concept are shown in Figs. 25 and 26. In Fig. 25, the entire wall is constructed with masonry units corresponding to unit 98 as illustrated in Fig. 11. Fig. 26, on the other hand, employs modular units 98 in conjunction with conventional plane-surfaced blocks 122.

A consideration of Figs. 13–26 clearly indicates the almost limitless possibilities of the modular masonry unit system of the invention. The illustrated wall patterns constitute only isolated examples of the multiplicity of wall patterns which may be achieved using only the block structures illustrated in Figs. 1 and 9–11, without resort to the additional embodiments described above in connection with Figs. 4–8 and 12. Thus, using only a relatively small number of modular units, it is possible to afford a great multiplicity of different wall patterns. By extending the modular series to include additional units such as those illustrated in the several figures, the potential number of geometric patterns which may be achieved becomes virtually infinite. Consequently, the modular system is tremendously advantageous as compared with previously known methods and makes construction of decorative masonry walls a practical economical reality.

In many instances, it may not be desirable to construct an entire wall in such a manner as to provide a decorative geometric pattern over the complete wall surface. For example, in at least some instances a frieze or bordering pattern may be desired on an otherwise plane-surfaced wall. Under these circumstances, a relatively small number of courses may be constructed with modular masonry units formed in accordance with the invention, the balance of the wall structure being formed with conventional single-surface masonry units. Usually, two or three of the courses are sufficient to provide a decorative geometric pattern constituting a frieze or border, although if small masonry units are employed it may be desirable to allot more courses to the decorative pattern. A typical example of a pattern suitable for use as a frieze is provided in Fig. 21. This pattern may be modified by retaining courses 130 and 131 in their illustrated form and by utilizing conventional single-surface blocks for the remainder of the wall surface. With this modification, a frieze highly suitable for use in religious buildings is formed. Of course, any of the other illustrated patterns may be similarly employed as the basis for frieze or bordering designs, the possibilities in this type of construction being almost limitless as in the case of completely patterned wall structures.

Hence while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A masonry unit having a rectangular display face with longitudinal and transverse edges, said longitudinal edge being of given length L, for providing a continuous straight line geometric pattern between boundary surfaces of adjacent blocks when mounted in bonded courses in a masonry wall having mortar joints of given thickness T encompassing said unit, the mortar joints having longitudinal and transverse centerlines parallel to the longitudinal and transverse edges of said unit, said longitudinal centerlines each having a length B equal to $L+T$, said masonry unit display face comprising first and second planar surfaces offset with respect to each other and interconnected by a planar boundary surface, said boundary surface starting at one transverse edge of said display face at a point closely adjacent to but spaced from the corner formed by said transverse edge and a first longitudinal edge of said unit, said boundary surface terminating on the second longitudinal edge of said unit at a point displaced from said one transverse edge by a distance slightly less than $B/4$, said boundary surface, when said unit is mounted in a masonry wall as aforesaid, being aligned with the intersection of the longitudinal and transverse mortar centerlines adjacent said corner of said unit and with a point on the remaining longitudinal centerline spaced from said transverse mortar centerline by a distance equal to $B/4$.

2. A masonry unit having a rectangular display face with longitudinal and transverse edges, said longitudinal edges being of given length L, for providing a continuous straight line geometric pattern between boundary surfaces of adjacent blocks when mounted in bonded courses in a masonry wall having mortar joints of given thickness T encompassing said unit, the mortar joints having longitudinal and transverse centerlines parallel to the longitudinal and transverse edges of said unit, said longitudinal centerlines each having a length B equal to $L+T$, said masonry unit display face comprising first, second and third planar surfaces, said second and third surfaces being offset with respect to said first surface and being interconnected with said first surface by a pair of planar boundary surfaces, said boundary surfaces starting at opposed transverse edges of said display face each originating at a point closely adjacent to but spaced from a corner formed by the transverse edge and by a longitudinal edge of said unit, said boundary surfaces each terminating on the other longitudinal edge of said unit at a point displaced from said transverse edge by a distance slightly less than $B/4$, said boundary surfaces, when said unit is mounted in a masonry wall as aforesaid, being aligned with the intersections of the longitudinal and transverse mortar centerlines adjacent said corners of said unit and with points, on the remaining longitudinal centerline, spaced from said transverse centerlines by a distance equal to $B/4$.

3. A masonry wall comprising a plurality of masonry units of similar size and each having a rectangular display face with longitudinal and transverse edges, said longitudinal edges being of given length L, said masonry wall having mortar joints of given thickness T encompassing each of said units, the mortar joints having longitudinal and transverse centerlines parallel to the longitudinal and transverse edges of said unit, said longitudinal centerlines each having a length B equal to $L+T$, said masonry unit display faces each comprising first and second planar surfaces offset with respect to each other and interconnected by a planar boundary surface, said boundary surface starting at one transverse edge of said display face at a point closely adjacent to but spaced from the corner formed by said transverse edge and a first longitudinal edge of said unit, said boundary surface terminating on the second longitudinal edge of said unit at a point displaced from said one transverse edge by a distance slightly less than $B/4$, said boundary surface being aligned with the intersection of the longitudinal and transverse mortar centerlines adjacent said corner of said unit and with a point on the remaining longitudinal centerline spaced from said transverse centerline by a distance equal to $B/4$, the boundary surfaces of at least some of the adjacent blocks being aligned with each other and defining a straight line of a geometric pattern.

4. A construction system comprising a first masonry unit having a rectangular display face with longitudinal and transverse edges, said longitudinal edges being of given lengths L, for providing a continuous geometric pattern when mounted in bonded courses in a masonry wall having mortar joints of given thickness T encompassing said unit, the mortar joints having longitudinal and transverse centerlines parallel to the longitudinal and transverse edges of said unit, said longitudinal centerlines each having a length B equal to $L+T$, said masonry unit display face comprising first and second planar surfaces offset with respect to each other and interconnected by a planar boundary surface, said boundary surface starting at one transverse edge of said display face at a point closely adjacent to but spaced from the corner formed by said transverse edge and a first longitudinal edge of said unit, said boundary surface terminating on the second longitudinal edge of said unit at a point displaced from said one transverse edge by a distance slightly less than $B/4$, said boundary surface, when said first unit is mounted in a masonry wall as aforesaid, being aligned with the intersection of the longitudinal and transverse mortar centerlines adjacent said corner of said unit and with a point on the remaining longitudinal centerline spaced from said transverse centerline by a distance equal to $B/4$, said system further comprising a second masonry unit substantially similar to said first masonry unit but with the boundary surface in said second unit extending parallel to said transverse edges of said unit and being aligned, when said second unit is mounted in a wall as aforesaid, with points on said longitudinal mortar centerlines spaced from said transverse mortar centerlines by a distance equal to an integral multiple of $B/4$ the boundary surfaces of at least some of the adjacent blocks being aligned with each other and defining straight line of a geometric pattern.

5. A modular construction system for masonry walls having mortar joints of given thickness and comprising a series of different masonry units each having first and second parallel face surfaces spaced from each other by a predetermined distance small in relation to the thickness of said units, said face surfaces terminating in each instance at points aligned with complementary quarter-modular points along the longitudinal base lines of said units when incorporated in a masonry wall and being linked by a boundary surface of regular geometric configuration effectively interconnecting the longitudinal base lines, said longitudinal base lines comprising the center lines of said mortar joints to afford a multiplicity of different combinations of similar units with corresponding surfaces matched to each other and to afford a further multiplicity of different combinations of mixtures of different units with corresponding surfaces matched to each other, said boundary surfaces of adjacent blocks being aligned and defining a straight line of a geometric pattern on the face of a wall in either stacked or running bond, said masonry unit series including at least one unit in which said boundary surface is normal to said longitudinal base lines and effectively interconnects corresponding quarter-points on the longitudinal base lines of said unit when incorporated in a masonry wall and further including at least one unit in which said boundary surface effectively interconnects quarter-points on the longitudinal base lines which are displaced by one quarter-modular distance with respect to each other.

6. A modular construction system for masonry walls having mortar joints of given thickness and comprising a series of different masonry units each having first and second parallel face surfaces spaced from each other by a predetermined distance small in relation to the thickness of said units, said face surfaces terminating in each instance at points aligned with complementary quarter-modular points along the longitudinal base lines of said units when incorporated in a masonry wall and being linked by a boundary surface of regular geometric configuration effectively interconnecting the longitudinal base lines, said longitudinal base lines comprising the center lines of said mortar joints to afford a multiplicity of different combinations of similar units with corresponding surfaces matched to each other and to afford a further multiplicity of different combinations of mixtures of different units with corresponding surfaces matched to each other, said boundary surfaces of adjacent blocks being aligned and defining a straight line of a geometric pattern on the face of a wall in either stacked or running bond, said masonry unit series including at least one unit in which said boundary surface is normal to the longitudinal edges thereof and effectively interconnects corresponding quarter-points on the longitudinal base lines of said unit when incorporated in a masonry wall and further including at least one unit in which said boundary surface effectively interconnects quarter-points on the longitudinal base lines which are displaced by one quarter-modular distance with respect to each other, at least one unit of said series having said first face surface disposed centrally of the face of said unit to divide said second face surface into two separated sections.

7. A masonry wall comprising a plurality of masonry units of uniform face area joined in a wall structure by mortar joints of predetermined thickness and each having first and second parallel face surfaces spaced from each other by a predetermined distance small in relation to the thickness of said units, said face surfaces terminating in each instance at points aligned with complementary quarter-modular points along the longitudinal base lines of said units, said base lines being the longitudinal center lines of said mortar joints, said face surfaces being linked in each instance by a boundary surface of regular geometrical configuration effectively interconnecting said quarter-modular points on the longitudinal base lines, said units being disposed in said wall in a predetermined alignment with respect to each other, said boundary surfaces of adjacent blocks being aligned and defining a straight line of a geometric pattern.

8. A masonry wall comprising a plurality of masonry units of uniform face area joined in a wall structure by mortar joints of predetermined thickness and each having first and second parallel face surfaces spaced from each other by a predetermined distance small in relation to the thickness of said units, said face surfaces terminating in each instance at points aligned with complementary quarter-modular points along the longitudinal base lines of said units, said base lines being the longitudinal center lines of said mortar joints, said face surfaces being linked in each instance by a boundary surface of regular geometrical configuration effectively interconnecting said quarter-modular points on the longitudinal base lines, said units being disposed in said wall in a predetermined alignment with respect to each other, said boundary surfaces of adjacent blocks being aligned and defining a straight line of a geometric pattern, said masonry wall including at least two distinct types of masonry units having different face surface configurations.

9. A masonry wall comprising a plurality of masonry units of uniform face area joined in a wall structure by mortar joints of predetermined thickness and each having first and second parallel face surfaces spaced from each other by a predetermined distance small in relation to the thickness of said units, said face surfaces terminating in each instance at points aligned with complementary quarter-modular points along the longitudinal base lines of said units, said base lines being the longitudinal center lines of said mortar joints, said face surfaces in each instance being linked by a boundary surface of regular geometrical configuration effectively interconnecting said quarter-modular points on the longitudinal base lines, said units being disposed in said wall in a predetermined alignment with respect to each other, said boundary surfaces of adjacent blocks being aligned and defining a straight line of a geometric pattern, at least some of said masonry units having boundary surfaces which extend normal to the longitudinal base lines of said units and effectively interconnect corresponding quarter points on the longitudinal base lines.

10. A masonry wall comprising a plurality of masonry units of uniform face area joined in a wall structure by mortar joints of predetermined thickness and each having first and second parallel face surfaces spaced from each other by a predetermined distance small in relation to the thickness of said units, said face surfaces terminating in each instance at points aligned with complementary quarter-modular points along the longitudinal base lines of said units, said base lines being the longitudinal center lines of said mortar joints, said face surfaces being linked in each instance by a boundary surface of regular geometrical configuration effectively interconnecting said quarter-modular points on the longitudinal base lines, said units being disposed in said wall in a predetermined alignment with respect to each other, said boundary surfaces of adjacent blocks being aligned and defining a straight line of a geometric pattern, at least some of said masonry units having boundary surfaces which effectively interconnect quarter points on the longitudinal base lines of said units which are displaced by one quarter-modular distance with respect to each other.

References Cited in the file of this patent

UNITED STATES PATENTS

| | | |
|---|---|---|
| D. 62,880 | Castellani | Aug. 21, 1923 |
| D. 133,306 | Larson | Aug. 4, 1942 |
| D. 175,392 | Clanton | Aug. 23, 1955 |
| D. 178,720 | Clanton | Sept. 11, 1956 |
| 36,155 | Huber | Aug. 12, 1862 |
| 72,557 | Stewart | Dec. 24, 1867 |
| 724,288 | Hering | Mar. 31, 1903 |
| 763,945 | Whitmore | June 28, 1904 |
| 1,269,674 | Bacigalupo | June 18, 1918 |
| 1,397,035 | Colosimo | Nov. 15, 1921 |
| 1,654,631 | Bevier | Jan. 3, 1928 |
| 1,679,684 | Rota | Aug. 7, 1928 |
| 2,315,418 | Haaker | Mar. 30, 1943 |

FOREIGN PATENTS

| | | |
|---|---|---|
| 1,152 | Great Britain | of 1898 |
| 566,801 | Great Britain | of 1945 |